Aug. 21, 1928.

J. L. BRETON 1,681,839

DISH WASHING, STERILIZING, AND DRYING MACHINE

Original Filed Nov. 8, 1923     2 Sheets-Sheet 1

INVENTOR
JULES LOUIS BRETON
BY
ATTORNEYS

Aug. 21, 1928.
J. L. BRETON
1,681,839
DISH WASHING, STERILIZING, AND DRYING MACHINE
Original Filed Nov. 8, 1923    2 Sheets-Sheet 2
Fig. 3
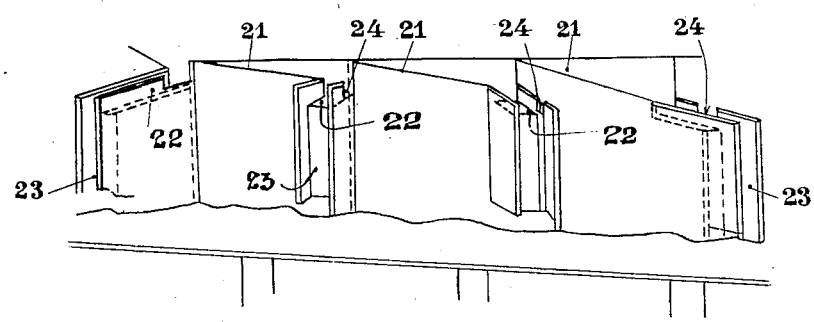
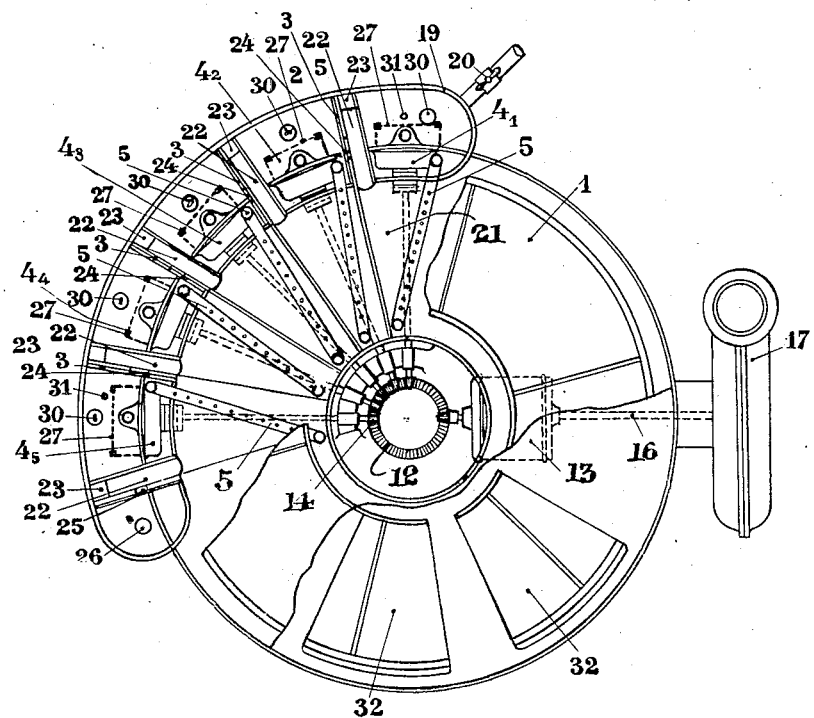
Fig. 2
INVENTOR
JULES LOUIS BRETON
BY *Munn & Co*
ATTORNEYS Patented Aug. 21, 1928.

1,681,839

UNITED STATES PATENT OFFICE.

JULES LOUIS BRETON, OF BELLEVUE, FRANCE.

DISH WASHING, STERILIZING, AND DRYING MACHINE.

Original application filed November 8, 1923, Serial No. 673,542, and in France May 7, 1923. Divided and this application filed June 3, 1925. Serial No. 34,664.

The application is a divisional application of application Serial #673,542, filed November 8, 1923.

The present invention has for its object a dish washing, sterilizing and drying machine for continuous working and large output.

In the appended drawings

Fig. 2 is a plan view of said machine.

Fig. 3 is a perspective view of the conduit for the water circulation.

Figure 1:
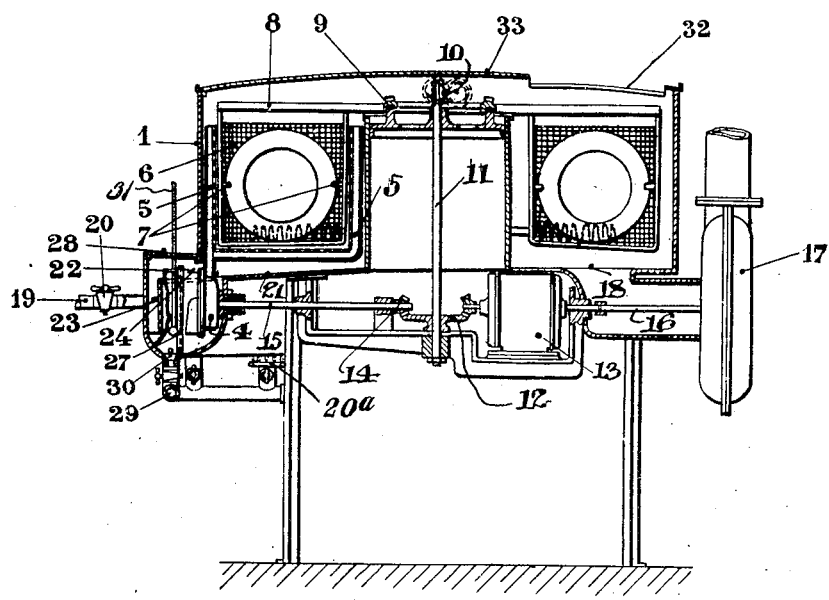
Fig. 1 is a vertical section through the machine in which the basket is placed horizontally.

The circular apparatus shown in Figs. 1 and 2 comprises an annular vessel 1 having disposed below the same and upon a part of the periphery a basin 2 having the form of a trough and subdivided by various partitions 3 into a number of chambers corresponding to the centrifugal pumps used in the apparatus, for instance five in the present example.

The said pumps discharge the water, which they have withdrawn from their respective chambers, through apertured tubes 5 placed at the bottom and along the vertical walls of the receptacle.

The said basket formed of large-mesh wire netting, is provided with iron wire loops 7 adapted to hold the dishes while offering no obstacle to the proper stowing of the various kinds of dishes such as soup dishes, sauce dishes, large flat dishes, stewed fruit dishes, cups, etc.

The said basket is held by the spokes 8 of an upper wheel resting upon a circular row of balls 9 and driven, through the medium of a speed-reduction element consisting of spur and worm gearing 10, by the central shaft 11 upon which is mounted a bevel gear 12.

The latter gear is driven by a motor 13 through the medium of a second bevel gear. The bevel gear 12 also drives on the other hand, by the bevel gearing 14 made of fibre or rawhide, and the shafts 15, the rotating wheels of the pumps 4.

The motor 13 drives directly by a shaft 16 a turbine blower 17 which withdraws through an orifice 18 the vapours and fumes as well as the air from the basket, thus ensuring the proper drying of dishes therein.

Boiling water enters through a conduit 19 whose output can be regulated by a cock 20. A burner $20^a$ placed below the first chamber will maintain the water therein at about 100 degrees centigrade.

This water which is withdrawn by a pump $4^1$ is discharged upon the dishes through the first apertured tube 5. It provides for the last rinsing and the sterilizing of the dishes and then falls upon the bottom of the receptacle and into an inclined part 21 which leads it to a trough 22 whence it flows into the feed tank of the pump $4^1$ through a tube 23 which descends to the bottom. But since a small stream of water will constantly enter through the cock 20, a corresponding part of the water returning through the trough 22 will be unable to flow off, and it will pass through an overflow 24 into the feed tank of the next pump $4^2$.

The water withdrawn by the latter pump is now sent upon the dishes, and it then acts in like manner to supply the feed tank of the pump $4^3$, and so on to the last pump of the series.

In this manner the water which proceeds from one chamber into the next will always be the water which has been sent the greatest number of times upon the dishes, this being the foulest and the coolest, and this ensures the best use of the washing water and provides for the washing of the maximum number of dishes for a stated amount of water.

Lastly, the foul and cooled water, after being sent for the last times by the pump $4^5$ upon the least clean dishes whose débris and matter it takes up, is discharged into the sewer through the overflow 25 and the pipe 26.

In order to prevent a part of this material from being again sent upon the dishes from which it has been detached, the pumps are provided with fine wire gauze strainer partitions 27 which can be readily reached and cleaned by raising the covers 28.

The feed tanks of the said pumps can be emptied after the operation by means of a tube 29 and orifices 30.

The thermometers 31 placed in the tanks of the two end pumps $4^1$ and $4^5$ enable the proper operation of the washing to be carried out.

A cover 33 serves to cover the whole apparatus, and it is provided with openings for inserting the dishes at 32 and removing them at $32^1$.

Having now particularly described and ascertained the nature of my said invention and in what manner the same is to be performed, I declare that what I claim is:

In a machine for washing, sterilizing and drying dishes, the combination of a circular washing trough the walls of which are provided with apertures for the introduction of the soiled dishes and for the removal of the clean dishes, a dish holding basket also of circular shape in the said washing trough, means for rotating slowly the said dish holding basket, means for projecting upon the dishes jets of washing water and jets of rinsing water, pumps for supplying the said means with washing and rinsing water, tanks disposed in cascade below the washing trough and adapted to receive the water projected by each pump, the first pump being adapted to withdraw the water of the first tank, said first tank being adapted to receive the water projected by the said first pump, the second pump being adapted to withdraw the water of the second tank, said second tank being adapted to receive the water projected by the said second pump, a pipe for the continuous supply of clear and boiling water and a series of overflow devices through which the water in excess flows successively from one tank into the next and finally into the sewer, the direction of the displacement of the dishes being contrary to the direction of the flow of the water, means for withdrawing the air and the vapors out of the washing trough and for producing an air current through the apertures through which the said dishes are introduced into and removed from the said trough.

In testimony whereof I have hereunto affixed my signature.

JULES LOUIS BRETON.